United States Patent [19]

Brouwer

[11] Patent Number: 5,931,438
[45] Date of Patent: Aug. 3, 1999

[54] DISPLACEMENT ADJUSTMENT DEVICE

[75] Inventor: Stefan Frits Brouwer, Den Haag, Netherlands

[73] Assignee: IKU Holding Montfoort B.V., Montfoort, Netherlands

[21] Appl. No.: 08/817,631

[22] PCT Filed: Oct. 24, 1995

[86] PCT No.: PCT/NL95/00369

§ 371 Date: Jul. 7, 1997

§ 102(e) Date: Jul. 7, 1997

[87] PCT Pub. No.: WO96/13404

PCT Pub. Date: May 9, 1996

[30] Foreign Application Priority Data

Oct. 27, 1994 [NL] Netherlands ............................ 9401791

[51] Int. Cl.[6] ............................... A47G 1/24; F16D 7/02; F16D 51/00; F16H 27/02

[52] U.S. Cl. ........................ 248/481; 74/89.15; 359/874; 188/77 W; 464/30; 464/40

[58] Field of Search .................... 248/476, 477, 248/480, 481, 466, 292.12; 74/89.14, 89.15, 411.5, 459, 425; 359/841, 872, 873, 874, 875, 876, 877; 188/77 W; 464/30, 40

[56] References Cited

U.S. PATENT DOCUMENTS

| | | | |
|---|---|---|---|
| 1,126,780 | 2/1915 | Jones ..................................... | 192/81 C |
| 2,533,973 | 12/1950 | Starkley ................................ | 464/56.2 |
| 3,733,914 | 5/1973 | Sheesley ............................... | 74/89.15 |
| 4,046,241 | 9/1977 | Furtah .................................. | 192/150 |
| 4,482,211 | 11/1984 | Fisher .................................. | 350/637 |
| 4,527,683 | 7/1985 | Mathews ............................... | 192/111 |
| 4,881,418 | 11/1989 | Fimeri ................................. | 74/89.14 |
| 4,940,321 | 7/1990 | Yoshida ............................... | 74/89.15 |
| 4,948,242 | 8/1990 | Desmond et al. ..................... | 350/637 |
| 4,979,810 | 12/1990 | Ogasawara ........................... | 350/633 |
| 5,436,769 | 7/1995 | Gilbert et al. ........................ | 359/874 |
| 5,625,502 | 4/1997 | Hoogenboom et al. .............. | 359/872 |

Primary Examiner—Derek J. Berger
Assistant Examiner—Michael Nornberg
Attorney, Agent, or Firm—Roger A. Johnston

[57] ABSTRACT

A displacement adjustment device (100) for at least partly converting a rotation into a translation, comprising: a rotation input member (114) which is bearing-mounted so as to be rotatable but axially secured relative to a frame said rotation input member (114) being provided with a hollow (116) extending axially therethrough; a bar (11) positioned in the hollow (116) and having its outside surface provided with a screw thread (17), means (12) being prvided for preventing rotation of said bar (11) relative to a frame; and a coupling gear wheel (120) arranged for rotation in the rotation input member (114), wherein the axis of rotation of the coupling gear wheel (120) is substantially perpendicular to the axis of rotation input member (114), wherein the coupling gear wheel (120) has teeth (121) engaging with the screw thread (17) of the bar (11) and, wherein the rotation bearing of the coupling gear wheel (120) comprises a slip coupling (130) relative to the rotation input member (114). An example of an application of such a device is in a mirror adjusting instrument of a vehicle.

16 Claims, 5 Drawing Sheets

DISPLACEMENT ADJUSTMENT DEVICE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention relates to a displacement adjustment device for at least partly converting a rotation into a translation. More in particular, the invertion can relate to a displacement adjustment device, comprising two parts capable of carrying out both a rotation movement and a linear displacement relative to each other, one part being provided with a screw thread, and coupling means being provided for coupling the other part to this screw thread.

Such a device is known in practice for effecting a linear movement by means of a motor. An example of an application of such a device is in a mirror adjusting instrument. When for instance a wing mirror of a vehicle comprises such an instrument, it is easy for the driver to remotely adjust the position of the mirror plate of that wing mirror.

In an elementary embodiment, a known displacement adjustment device has a rotatable gear wheel provided with an internal screw thread, and a bar extending therethrough and provided with an external screw thread which engages with this internal screw thread. The bar is attached to an object to be adjusted, for instance a support plate for a mirror plate of a wing mirror, in such a manner that this bar cannot rotate. When the gear wheel is driven for rotation, the non-rotatable bar is forced to move linearly along its longitudinal axis.

This elementary embodiment has a number of imperfections. In the first place, it may happen that some kind of obstacle restrains the displacement of the bar, such as for intance an end stop. When a driving motor is then energized, it will be unable to rotate, which involves the risk of the motor burning out. In the second place, for some applications it is desired or even necessary that the object to be adjusted can also be adjusted by hand, for instance to enable it to yield to an unanticipated load from outside, but also to permit carrying out an adjustment even in the event of electric failures, which, for reasons of safety, is important in particular with the above-mentioned example of a wing mirror. In the above-mentioned elementary embodiment, such a manual adjustment is not possible.

In order to overcome these imperfections in the elementary embodiment, it is provided with means for enabling a temporary uncoupling. In this connection, the internal screw thread of the rotatable gear wheel is subdivided into a number of segments, which segments are attached to that gear wheel for radial spring action. When an axial force is exerted on those segments, for instance by one of the above-mentioned causes, those segments will be radially forced outwards and thus be released from the engagement with the external screw thread of the bar. Upon further rotation of the gear wheel or further displacement of the bar, the segments will engage with the external screw thread of the bar again, but then shifted by one helix.

Although the elementary embodiment thus modified indeed solves the above-mentioned imperfections, it nevertheless involves some drawbacks.

The first drawback concerns the fact that this construction produces a loud rattling noise, when the object to be displaced reaches an end stop, as well as when the object to be displaced is adjusted manually.

A second drawback concerns the fact that wear occurs, caused by the rattling displacement of the internal screw thread segments over the external screw thread of the bar.

A third drawback, which is in particular involved in the application in a mirror adjusting instrument, is that the object (mirror plate) to be displaced cannot be adjusted continuously (in stepless fashion), but can only reach positions defined by the pitch of the external screw thread of the bar.

A fourth drawback concerns the fact that when the object to be displaced is manually adjusted in a first direction, the required force generally differs from, the force necessary for manual adjustment in the opposite direction.

The object of the invention is to overcome the above-mentioned drawbacks.

German Offenlegungsschrift 2,759,230 describes a displacement adjustment device for pivoting a car mirror by means of a motor. In this known displacement adjustment device, a screw spindle is disposed so as to be rotatable but axially fixed relative to a frame, which screw spindle is driven for rotation by an electromotor with the interposition of a worm/worm wheel transmission. This known displacement adjustment device further comprises an adjusting member which is coupled on the one hand to a mirror and on the other to the screw spindle with the interposition of coupling means. These coupling means comprise a coupling gear wheel which is rotatably mounted relative to the adjusting member and which engages with the screw thread of the screw spindle, the bearing of the coupling gear wheel comprising a slip coupling relative to this adjusting member. The effect achieved with such a construction is that when an end position is reached or when an external force is exerted on the mirror, the parts of the device will not be loaded excessively, because the translation output member can even be axially displaced when the rotation input member is stationary, or the rotation input member can even be rotated when the translation output member is stationary; in those cases, the coupling wheel will rotate. Further, in the case of manual operation, such a displacement adjustment device can be adjusted in a stepless manner.

However, this known construction has some drawbacks. For instance, guide means are required for keeping the coupling wheel in mesh with the screw spindle. For that purpose, the publication describes an intricate construction having a telescopic part which is pressed against the screw spindle by means of spring force. This requires relatively much space, introduces play, and is relatively difficult to assemble. In addition, a user who wants to adjust the mirror manually will have to exert a force whose magnitude is not constant but depends on the pivoting position and the direction of adjustment: in one direction, that spring should be compressed further, whereas in the other direction the spring extends and hence "cooperates". The extent to which the spring should be compressed or extends depends on the angle which the telescopic part makes with the longitudinal direction of the screw spindle.

Another drawback concerns the fact that the screw spindle necessarily extends above the center face of the worm wheel coupled thereto. The lowest position of the axis of rotation of the coupling wheel moving along the screw spindle is located above that center face at a distance from the center face equal to the sum of the radius of that coupling wheel plus half the thickness of that worm wheel. This means that the turn of the coupling wheel in vertical direction is limited, or that the entire construction has a relatively large vertical dimension.

SUMMARY OF THE INVENTION

The object of the invention is to provide a displacement adjustment device which produces little noise, will show little wear, and wherein a driving motor is not excessively loaded when the displacement adjustment device reaches an end position, whereas the drawbacks mentioned are absent.

A further object of the invention is to provide a displacement adjustment device which is easy to assemble.

A main object of the invention is to provide a displacement adjustment device in the form of a compact unit which is exchangeable with conventional versions. This on the one hand enables existing mirrors to be improved through replacement of the conventional displacement adjustment device. On the other hand, it enables the manufacturer to provide two different mirror adjusting instruments in a simple manner, viz. a version having the advantages of the present invention and a conventional version which does not have those advantages but which may comparatively be slightly cheaper, the only difference between those two versions residing in the choice of the displacement adjustment device, while all other components remain the same.

In accordance with a first aspect of the present invention, there is provided a displacement adjustment device for at least partly converting a rotation into a translation, comprising: a frame; a rotation input member which is bearing-mounted so as to be rotatable but axially secured relative to the frame, which rotation input member is provided with a hollow extending axially therethrough; a bar positioned in the hollow and having its outside surface provided with a screw thread, means being provided for preventing rotation of that bar relative to the frame; and a coupling gear wheel arranged for rotation in the rotation input member, the axis of rotation of the coupling gear wheel being substantially perpendicular to the axis of rotation of the rotation input member, the coupling gear wheel having teeth engaging with the screw thread of the bar, and the rotation bearing of the coupling gear wheel comprising a slip coupling relative to the rotation input member.

In accordance with a second aspect of the present invention, there is provided a displacement adjustment device for at least partly converting a rotation into a translation, comprising: a frame; a rotation input member which is bearing-mounted so as to be rotatable but axially secured relative to the frame, which rotation input maker is provided with a hollow extending axially therethrough; a bar positioned in the hollow and having its outside surface provided with a screw thread, means being provided for preventing rotation of that bar relative to the rotation input member; and a coupling gear wheel arranged for rotation in the frame or a part fixed thereto, the axis of rotation of the coupling gear wheel being substantially perpendicular to the axis of rotation of the bar, the coupling gear wheel having teeth engaging with the screw thread of the bar, and the rotation bearing of the coupling gear wheel comprising a slip coupling relative to the frame or the part fixed thereto.

Further aspects, characteristics and advantages of the present invention will be further explained by the following description of preferred embodiments of the displacement adjustment device according to the invention, with reference to the accompanying drawings, wherein:

DETAILED DESCRIPTION OF THE INVENTION

Figure 1:
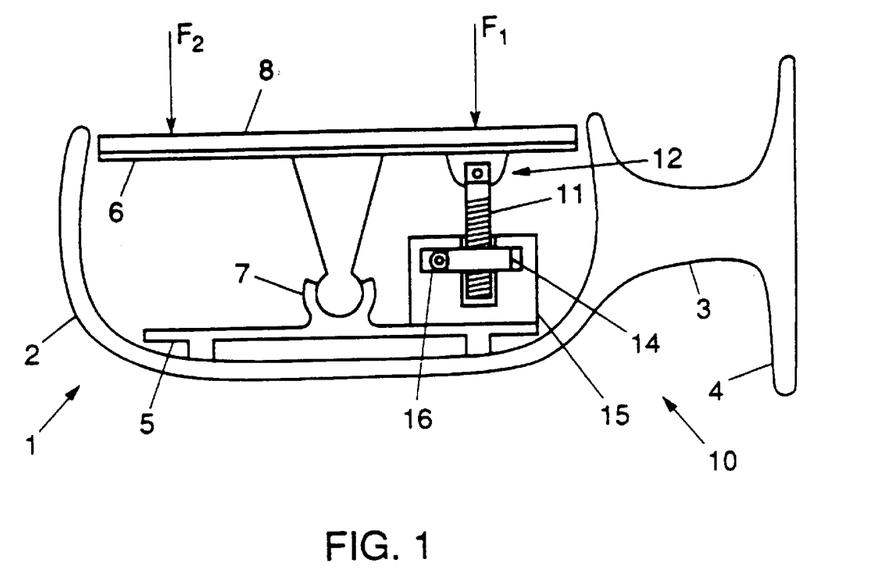
FIG. 1 is a schematic section of a wing mirror.

By way of example of an application of a displacement adjustment device, reference is now made to FIG. 1, which schematically shows a section of a wing mirror generally designated by reference numeral 1. The wing mirror 1 comprises a bowl-shaped housing 2, attached to an outer end of an arm 3 whose other outer end comprises a mounting plate 4 with which the wing mirror 1 can be mounted on a vehicle, not shown. Mounted in the housing 2 is a frame 5. Attached to the frame 5 is a mirror support plate 6, pivotable about a pivot 7, on which mirror support plate 6 a mirror plate 8 is mounted.

It is observed that the hitherto described parts of the wing mirror 1 are of a generally known nature.

Arranged in the wing mirror 1 is a displacement adjustment device generally designated by reference numeral 10. This device comprises a bar 11, coupled by a first outer end 12 to the mirror support plate 6, in such a manner that at that first outer end 12, the bar 11, which is substantially perpendicular to the mirror support plate 6, can carry out a pivotal movement relative to that mirror support plate 6 so as to be able to take up a pivotal movement of the mirror support plate 6 about the pivot 7. That pivotal movement of the mirror support plate 6 can take place if the bar 11 is axially displaced. For effecting an axial displacement of the bar 11, the displacement adjustment device 10 comprises a worm wheel 14, driven for rotation by a worm 16 mounted on a driven shaft of an electromotor, not shown for simplicity's sake. The worm wheel 14 is rotatably accommodated in a bearing 15 attached to the frame 5, which bearing permits a rotation of the gear wheel 14, but does not permit axial displacement thereof along the axis of rotation. The construction of the pivot at the first outer end 12 of the bar 11 is such that the bar 11 is secured against rotation relative to the mirror support plate 6 and, accordingly, relative to the frame 5.

Before the operation of the known displacement adjustment device 10 is described in more detail, it is assumed that the axial displacement of the bar 11 causes the mirror support plate 6 to pivot about a pivot axis which extends through the pivot 7 and is perpendicular to a line connecting the bar 11 and the pivot 7. Usually, for effecting a second pivotal movement in a direction perpendicular to the first-mentioned pivotal movement, a second displacement adjustment device is present, which second displacement adjustment device is not shown in FIG. 1 for simplicity's sake, but which may be identical to the first-mentioned displacement adjustment device 10. Further, it is observed that the coupling locations on the mirror support plate 6 for the two bars of those displacement adjustment devices are usually chosen so that these pivotal movements substantially take place in a horizontal and a vertical direction.

Figure 2:
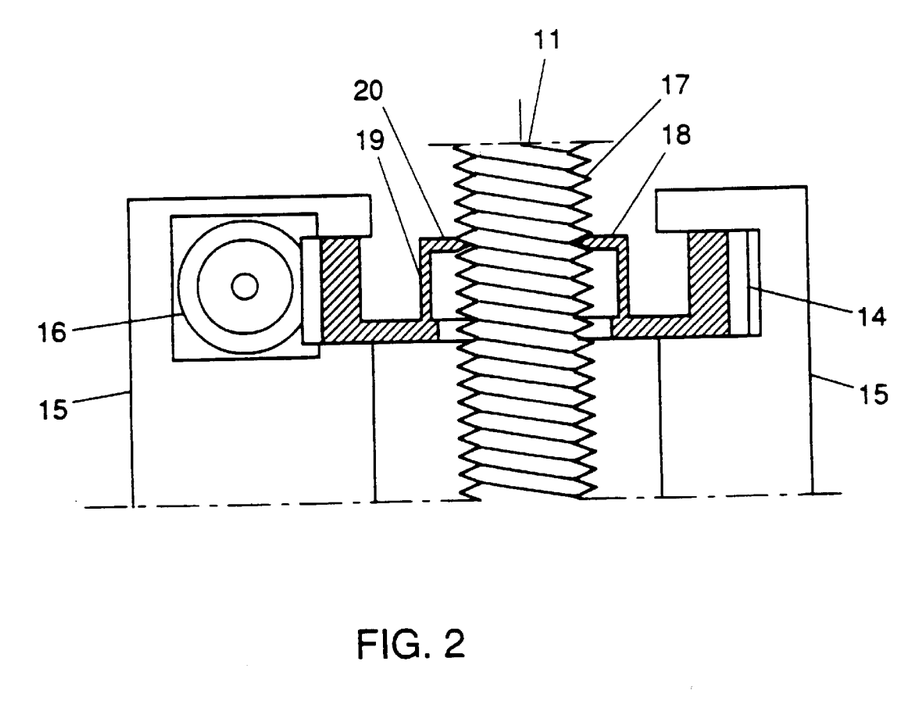
FIG. 2 is a schematic section of a conventional displacement adjustment device.

For a more detailed description of the operation of the known displacement adjustment device 10, reference is now made to FIG. 2. Extending centrally through the worm wheel 14 is the bar 11, whose outside surface is provided with an external screw thread 17. For engagement with this external screw thread 17, the worm wheel 14 comprises a number of segments 18, for instance three, having the shape of a capital L whose long leg 19 is directed axially and extends along the screw thread 17, and whose short leg 20 is directed inwardly and comprises an outer end suitable for engagement with the external screw thread 17.

The segments is are made of plastic or metal, in such a manner that the long legs 19 have some elasticity. In general, the worm wheel 14 with the segments 18 is manufacted as one whole from plastic.

During normal use, the short legs 20 of the segments 18, which short legs engage with the screw thread 17, provide a screw coupling between the worm wheel 14 and the bar 11. If through excitation of the above-mentioned motor, the worm 16 is then rotated to cause the worm wheel 14 to rotate, the bar 11 is forced to move in its longitudinal direction, as a result of which, as mentioned hereinabove, the mirror support plate 6 and, accordingly, the mirror plate 8 are pivoted. It is true that this meets with some counterforce, inter alia because of the presence of friction means (not shown for simplicity's sake) to prevent undesired vibration of the mirror during driving, but the segments 18 are sufficiently rigid to overcome that counterforce.

However, when the axial displacement of the bar 11 is obstructed, for instance because the mirror support plate 6 or the pivot 7 strikes a stop which defines the end position of the mirror, the segments 18 of the further rotating worm wheel 14 are forced outwards and the long legs 19 are bent, causing the short legs 20 to leave the screw thread 17. Upon still further rotation of the gear wheel 14, the short legs 20 engage with the screw thread 17 again, but then displaced over one thread. This process keeps repeating itself as long as the motor remains excited, while a rattling noise is produced. This further involves the occurrence of wear of the outer ends of the short legs 20 and of the screw thread 17.

When it is desired to pivot the mirror plate 8 manually, for instance because the electric system for the adjustment is defective, the user exerts a pressure force on the mirror plate 8, as indicated by the arrows F1 and F2 in FIG. 1. Consequently, the segments 18 of the stationary gear wheel 14 are forced outwards and the long legs 19 are bent, in a similar manner as described hereinabove. When the force exerted exceeds a predetermined threshold force, the short legs 20 will leave the screw thread 17, and the bar 11 can be further displaced in axial direction, with the short legs 20 "scraping" along the screw thread 17 producing a rattling noise. It will be understood that this involves wear as well.

When the mirror plate 8 is adjusted in this manner, only those positions can be reached wherein the short legs 20 engage with the screw thread 17 again. Even in the case of a very small pitch of the screw thread 17, this is an undesired limitation of the adjusting possibilities of the mirror plate 8.

A further drawback of the known construction is that the elasticity/rigidity of the plastic segments 18 is sensitive to variations in temperature.

Figure 3:
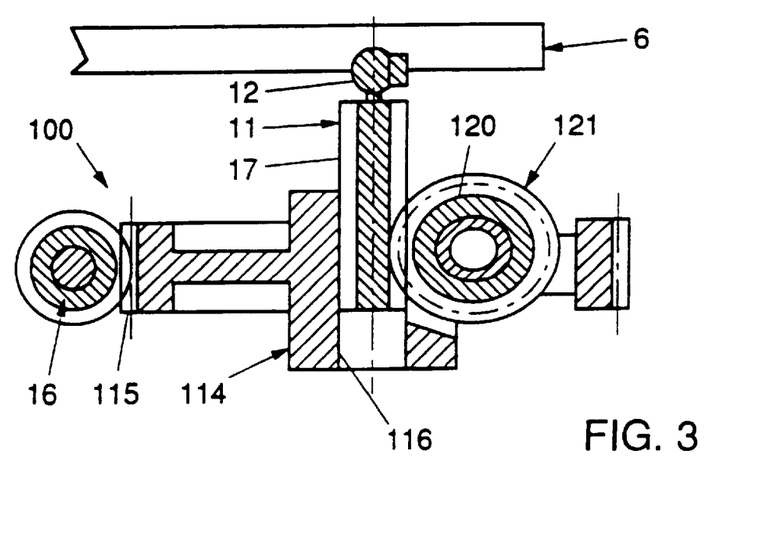
FIG. 3 schematically shows a preferred embodiment of a displacement adjustment device according to the present invention.
Figure 4:
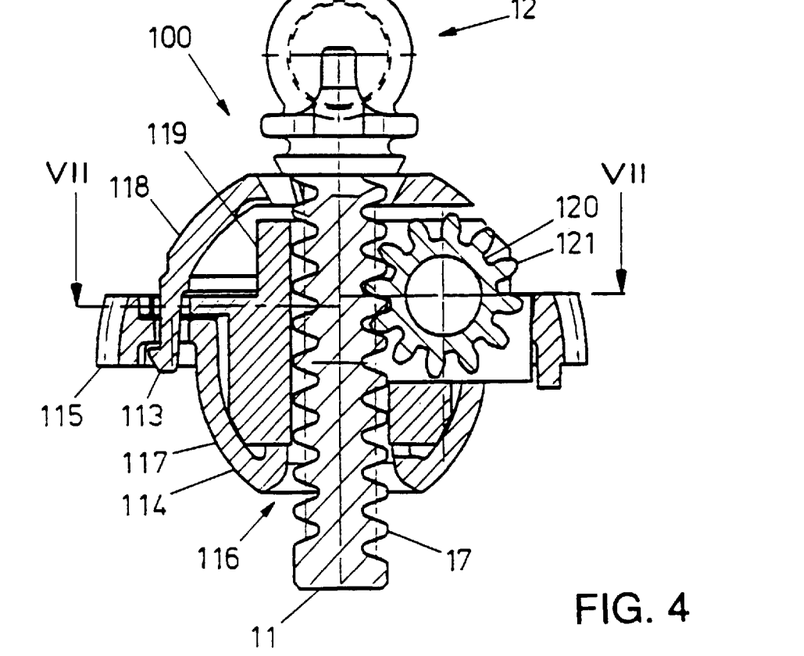
FIG. 4 shows the preferred embodiment of FIG. 3 in more detail.

Presently, a preferred embodiment 100 of the displacement adjustment device according to the present invention will be discussed with reference to FIGS. 3 and 4. FIG. 3 is a schematic representation, whereas FIG. 4 is a more detailed representation. As this preferred embodiment 100 is intended to be used in a mirror adjusting instrument as discussed with reference to FIG. 1, and it is preferred to design the displacement adjustment device so that it can without any problem serve as a replacement for existing displacement adjustment devices without adaptations having to be made to the existing mirror adjusting instrument, known parts such as the frame and the mirror housing have been left out in FIGS. 3 and 4, while the mirror support plate 6 is only partly indicated in FIG. 3 and is left out entirely in FIG. 4.

The displacement adjustment device 100 comprises a gear wheel 114 having external teeth 115, which, in the embodiment shown, are intended to be driven by the worm 16. Extending axially through the gear wheel 114 is a cylindrical hollow 116, inside of which the bar 11, having external screw thread 17, is disposed. The bar 11 has no or hardly any radial play within the hollow 116. The outer end 12 of the bar 11 has a shape suitable for attaching that outer end to the mirror support plate 6 so that the bar 11 can pivot at that place of attachment but is secured against rotation about its longitudinal axis.

The gear wheel 114 is intended to be mounted in a frame of a mirror adjusting instrument in such a manner that it has no axial and radial freedom of movement. However, when the mirror support plate 6 pivots, the bar 11 will assume an oblique position. To prevent the bar 11 from twisting within the gear wheel 114 in that event. The outside surface of the gear wheel 114 comprises spherical portions, as is clearly illustrated in FIG. 4. If the gear wheel 114 is mounted in a space of the frame having a corresponding spherical shape, the gear wheel 114 can tilt relative to the frame while maintaining the above-mentioned axial and radial securing.

Further, from the more detailed FIG. 4, it appears that the gear wheel 114 may consist of several parts, viz. a bottom shell 117, a top shell 118 and internal parts 119. However, this subdivision has only significance with regard to the manufacture of the gear wheel 114. The assembly takes place by placing the internal parts 119 in the bottom shell 117 and next fixing the top shell 118 on the bottom shell 117 by means of a snap connection 113, whereby the internal parts 119 are then simultaneously confined. This FIG. 4 further clearly shows that the spherical portions need not all have the same spherical shape. In the example shown, the outside surface of the top shell 118 has a greater radius than the outside surface of the bottom shell 117, and the teeth 115 have a still greater radius of a sphere. However, all these spherical surface portions do have a common center.

The gear wheel 114 has a function comparable with that of the gear wheel 14 of FIG. 1, but does not have a segmented internal screw thread. Instead, the gear wheel 114 comprises a coupling gear wheel 120 having outside teeth 121. Via a friction coupling 130 as will be described in more detail hereinbelow, the gear wheel 120 is rotatably disposed within (the internal parts 119 of) the gear wheel 114, the axis of rotation of the gear wheel 120 being substantially perpendicular to the axis of rotation of gear wheel 114. The outside teeth 121 are in engagement with the external screw thread 17 of the bar 11, the bar 11 and the coupling gear wheel 120 forming a worm/worm wheel transmission. It is observed that within the purview of the present invention, the phrase "the axis of rotation of the gear wheel 120 is substantially perpendicular to the axis of rotation of gear wheel 114" means that the shape and orientation of the coupling gear wheel is such that it can be driven as a worm wheel by the external screw thread 17 of the bar 11. This can for instance be effected by directing the axis of rotation of the coupling gear wheel 120 perpendicularly to the axis of rotation of gear wheel 114, with the coupling gear wheel 120 then having oblique teeth corresponding to the pitch angle of the external screw thread 17 of the bar 11. However, for manufacturing reasons, it may be preferred to provide the coupling gear wheel 120 with straight teeth; in such case, the axis of rotation of the coupling gear wheel 120 can be caused to make an angle with the axis of rotation of the gear wheel 114 which angle is defined by the pitch angle of the external screw thread 17 of she bar 11. Comparable observations apply, mutatis mutandis, to the embodiments to be discussed hereinafter, as will be readily understood by a skilled person.

Since the detailed construction of the gear wheel 114 is further not important to a skilled person for a proper understanding of the present invention, it will not be further discussed.

Presently, the operation of the displacement adjustment device 100 will be discussed. Under normal operating conditions, the coupling wheel 120 is fixed relative to the gear wheel 114, as a result of which the teeth 121 of the coupling wheel 120, which teeth engage with the screw thread 17, behave like rigid projections of the gear wheel 114. If the gear wheel 114 is rotated, the bar 11, secured against rotation at its outer end 12, is forced to move axially relative to the gear wheel 114, while the teeth 121 of the coupling wheel 120 which engage with the screw thread 17 follow this screw thread 17, in a manner analogous with the above-described operation of the conventional displacement adjustment device illustrated in FIG. 2. In this connection, it is observed that in the example shown, the bar 11 is at its outer end 12 secured against rotation relative to the frame 5, with the interposition of the mirror support plate 6, but that other means for providing such a rotational securing are also possible.

The bar 11 exerts a reaction force on the coupling wheel 120. This reaction force is directed axially relative to the bar 11, and tangentially relative to the coupling wheel 120, and hence tends to rotate the coupling wheel 120 about its axis of rotation. However, the bearing of the coupling wheel 120 in the gear wheel 114 forms a friction coupling 130. Such a coupling has the characteristic that it is able to transmit forces or moments up to a predetermined threshold value in excess of which the coupling starts to slip. For this reason, such a coupling is also referred to by the term "slip coupling". For the application of the present invention, in principle any friction coupling known per se is suitable, although hereinbelow, a preferred embodiment thereof will be described. In a simple construction, the coupling wheel 120 is mounted on a shaft fitting with an interference fit in a hole in the gear wheel 114 and, accordingly, the required friction of the friction coupling is simply provided by the interference fit. Hereinafter, the coupling wheel 120 will also be referred to by the term "slip wheel".

If the above-mentioned reaction force becomes greater than the above-mentioned threshold value of the friction coupling 130, for instance because an obstruction retains a further translation of the bar 11, for instance because the mirror plate 6 has reached an end position and strikes a stop, this friction coupling 130 starts to slip, causing the slip wheel 120 to rotate in the gear wheel 114. Consequently, the motor (not shown) driving the worm 16 rotates further in spite of the bar 11 being stationary, and is not loaded higher than this threshold value of the friction coupling 130. It is specifically pointed out that this produces hardly any noise.

Conversely, it is also possible to move the bar 11 axially when the motor is stationary, by manually exerting an axial force on the bar 11. Thus, a tangential force is exerted on the coupling wheel 120. When this force is greater than the above-mentioned threshold force of the friction coupling 130, the friction coupling will start to slip, so that the coupling wheel 120 starts to rotate relative to the gear wheel 114 and the bar 11 starts to slide relative to the gear wheel 114. Accordingly, the slip wheel 120 behaves like a toothed wheel traversing over a toothed rack.

It is specifically pointed out that this manner of sliding, too, produces hardly any noise. Further, it is especially pointed out that in this manner, the bar 11 can be brought into any desired position in a stepless manner, while by means of the motor, the bar 11 can in each case be brought from that position into any other desired position again. Accordingly, the manual displacement of the bar 11 has no adverse effect whatsoever on the motor operation.

The above characteristics render the principle discussed eminently suitable for being used in a displacement adjustment device, for instance for a mirror adjusting instrument. As appears in particular from FIG. 4, an important advantage of this displacement adjustment device 100 according to the present invention is that the gear wheel 114 with the coupling wheel 120 mounted therein is readily exchangeable for a conventional gear wheel 14 with the coupling means 18 mounted therein, illustrated only schematically in FIG. 2. The displacement adjustment device 100 can be supplied as a compact unit comprising the gear wheel 114 and the bar 11. However, it is also possible that the gear wheel 114 with the coupling wheel 120 mounted therein is provided separately, as a replacement unit, because the bar 11 for the displacement adjustment device 100 may be identical to the conventional bar 11.

Figure 5:
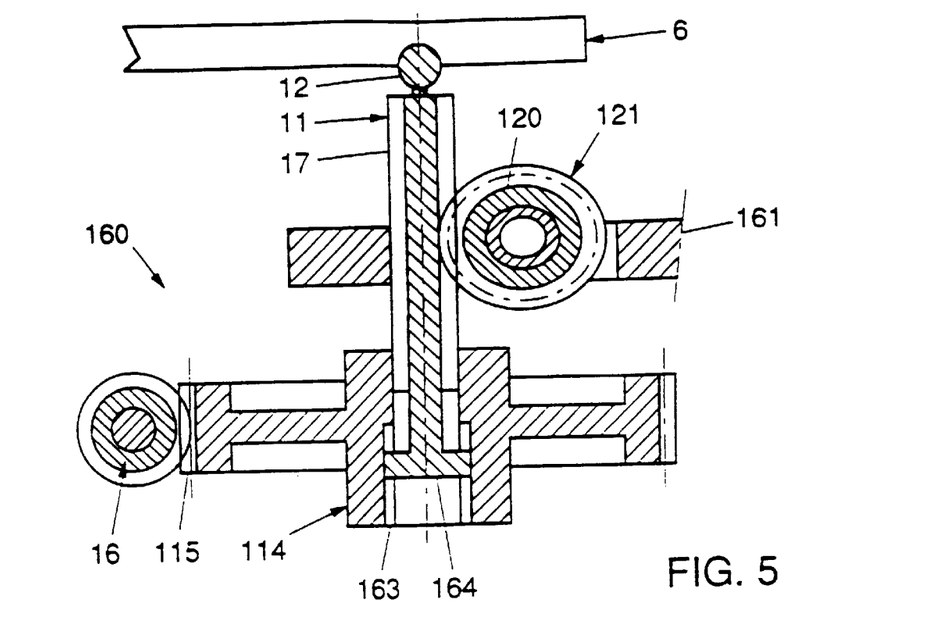
FIG. 5 shows another embodiment of a displacement adjustment device according to the present invention.

FIG. 5 shows a second embodiment 160 of a displacement adjustment device according to the present invention. Parts identical to or comparable with those in FIG. 3 have been designated by identical reference numerals. In this second embodiment 160, the bar 11 rotates along with the gear wheel 114. For that purpose, the bar 11 is secured in rotational sense relative to the gear wheel 114, for instance by radial projections 164 of the bar which engage axial slots 163 in the gear wheel 114 to allow a relative axial displacement of the bar 11 relative to the gear wheel 114. It is also possible that the bar 11 and the gear wheel 114 are manufactured as one whole, if that combination is mounted for axial displacement relative to the frame. The outer end 12 of the bar 11 has a shape suitable for attaching that outer end to the mirror support plate 6 so that at that point of attachment, the bar 11 cannot only pivot but also rotate about its longitudinal axis. That outer end 12 of the bar 11 can for instance define a ball joint together with the mirror support plate 6.

By 161 a part is designated which is intended to be fixed to the frame of a mirror adjusting instrument and which will be referred to as "subframe". That part 161 may also be an integral part of the frame of a mirror adjusting instrument.

By means of a friction coupling, a coupling wheel 120 is rotatably mounted in the subframe 161.

Under normal operating conditions, the coupling wheel 120 is fixed relative to the subframe 161, so that the teeth 121 of the coupling wheel 120 which engage with the screw thread 17 behave like rigid projections of the subframe 161. If the gear wheel 114 is rotated, the bar 11, rotating along therewith, is as it were screwed along those teeth 121 and thereby forced to move axially relative to the subframe 161 and thus relative to the gear wheel 114. In this case, too, the bar 11 exerts a reaction force on the coupling wheel 120, tangentially relative to the coupling wheel 120, and consequently tends to rotate the coupling wheel 120 about its axis of rotation. If the axial movement of the bar 11 is retained while the gear wheel 114 is rotating, this reaction force becomes greater than the above-mentioned threshold value of the friction coupling 130, and the screw thread 17 of the rotating bar 11 will cause the slip wheel 120 to rotate in the subframe 161, whilst the coupling between the bar 11 and the slip wheel 120 can be regarded as a worm/worm wheel coupling. Hence, the motor (not shown) driving the worm 16 rotates further in spite of the bar 11 being stationary, and is not loaded higher than the threshold value of the friction coupling 130. It is specifically pointed out that this produces hardly any noise.

Conversely, it is also possible to move the bar 11 axially when the motor is stationary, by manually exerting an axial force on the bar 11. Thus, a tangential force is exerted on the coupling wheel 120. When this force is greater than the above-mentioned threshold force of the friction coupling 130, the friction coupling will start to slip, so that the coupling wheel 120 starts to rotate relative to the subframe 161 and the bar 11 starts to slide relative to the gear wheel 114. Accordingly, the slip wheel 120 again behaves like a toothed wheel traversing over a toothed rack.

This manner of sliding, too, produces hardly any noise. Further, in this manner, the bar 11 can be brought into any desired position in a stepless manner, while by means of the motor, the bar 11 can in each case be brought from that position into any other desired position again.

A specific advantage of this embodiment 160 illustrated in FIG. 5 is its relatively simple construction. The subframe 161 with the coupling wheel 120 can readily be replaced by a subframe having fixed, flexible fingers, comparable with the segments 18 discussed with reference to FIG. 2.

Another specific advantage of this embodiment 160 illustrated in FIG. 5 resides in the fact that now more space is available for accommodating the coupling gear wheel 120.

A further specific advantage of this embodiment 160 illustrated in FIG. 5 relates to a possible construction for the friction coupling 130. Hereinbelow, an embodiment thereof is described which is based on a wrap spring. However, it is also possible to press the coupling gear wheel 120 into its bearing through an axial force, the required friction force being supplied through the friction of a principal surface of the coupling wheel 120 against that bearing or against the frame portion 161. The pressing force necessary for a proper operation requires rather a large pressure spring, and an important advantage of the embodiment 160 illustrated in FIG. 5 is that sufficient space is available for the positioning of such a pressure spring. In addition, it is observed that generally, a mirror of a vehicle is adjustable in two mutually perpendicular directions, for which purpose two individual adjustment devices of the type described will be present. In the embodiment 160 illustrated in FIG. 5, those two individual adjustment devices may have a shared pressure spring.

Figure 6:
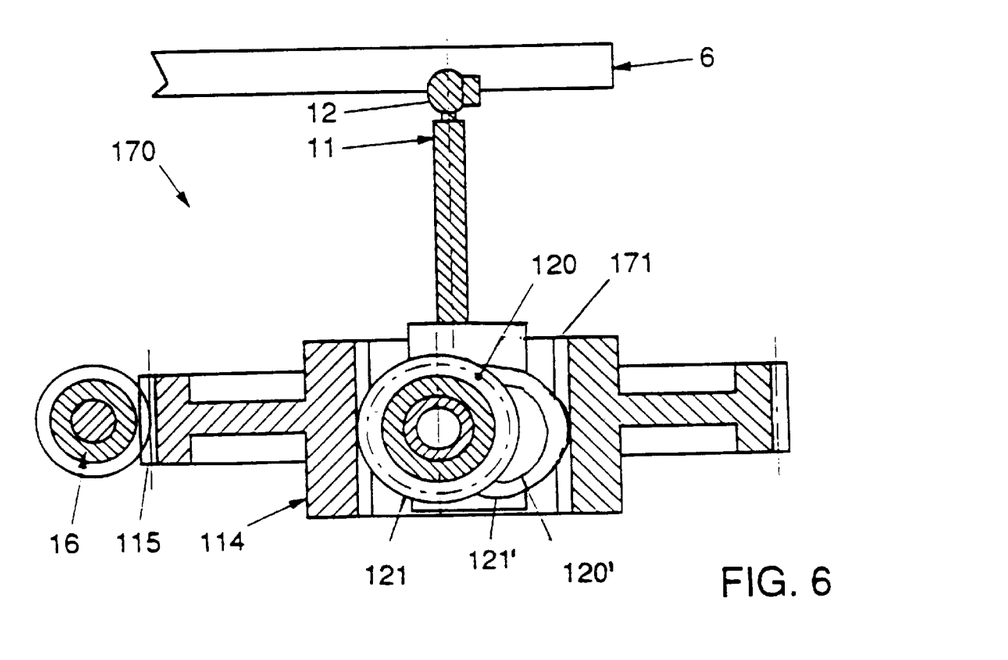
FIG. 6 schematically shows a variant of the displacement adjustment device of FIG. 3.

Presently, with reference to FIG. 6, a variant 170 of the embodiment of the displacement adjustment device according to the present invention and illustrated in FIGS. 3 and 4 will schematically be discussed.

The displacement adjustment device 170 again comprises a gear wheel 114 driven by a worm 16 via teeth 115 provided on an outside surface of the gear wheel 114, and a bar 11 which, at an outer end thereof, can be pivotably coupled to a mirror support plate and is secured against rotation. Unlike the preferred embodiment 100 of FIG. 3, the gear wheel 114 is provided with an internal screw thread 171, and a coupling wheel 120 is mounted on the other outer end of the bar 11, in fact in a similar manner as described hereinabove with regard to the coupling wheel 120 of FIG. 3. The teeth 121 of the coupling wheel 120 engage with the internal screw thread 171 of the gear wheel 114.

The operation of the displacement adjustment device 170 of FIG. 6 will be clear to a skilled person after reading the description of the operation of the displacement adjustment device 100 of FIG. 3, as a consequence of which the operation will not be explained once again.

A specific advantage of such an embodiment 170 in comparison with the embodiment 100 illustrated in FIG. 3 concerns the fact that in the embodiment 100, the coupling gear wheel 120 should be disposed adjacent the axis of rotation of the gear wheel 114. This implies that the radius of the gear wheel 114 should at least be equal to the radius of the bar 11 plus the diameter of the coupling gear wheel 120. On the other hand, in the embodiment 170, the coupling gear wheel 120 is disposed virtually centrally in the gear wheel 114, which implies that the radius of the gear wheel 114 need only be greater than the radius of the coupling gear wheel 120 (while for the sake of convenience, the dimension required for the external screw thread 115 is left unconsidered).

Figure 6A:
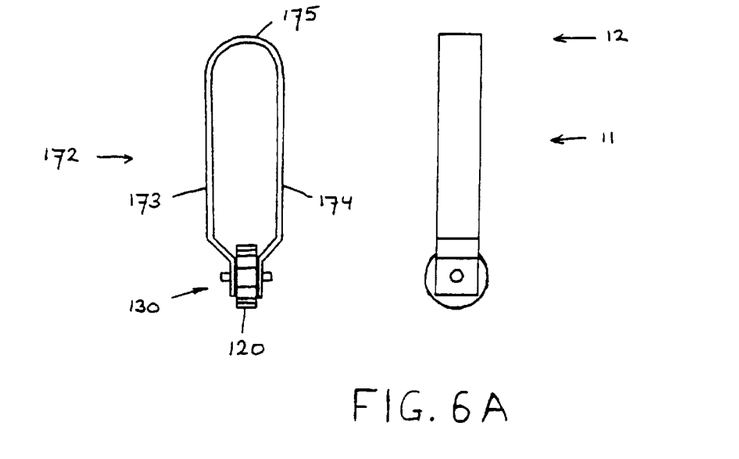
FIG. 6A schematically shows mutually perpendicular side elevations of a preferred detail of the embodiment shown in FIG. 6.

A further specific advantage of such an embodiment 170 will be explained with reference to FIG. 6A. This figure illustrates that the bar 11 can be shaped as a body 172 bent into the shape of a U and having legs 173 and 174, the coupling gear wheel 120 being bearing-mounted in the outer ends of those legs 173 and 174. The legs 173 and 174 are pretensioned towards each other, so that they exert a pinching force on the side faces of the coupling gear wheel 120. Owing to this pinching force, a friction coupling 130 is defined between the coupling gear wheel 120 and the body 172.

The outer end 12 of the bar 11 is defined by the central, U-shaped bend 175 of the body 172. It will be understood that it is readily possible to couple this bend to a mirror support plate 6 so as to be free from play and secured against rotation.

Accordingly, it is an important advantage that the function of bar 11 and friction coupling 130 can be carried out by one and the same part.

When the user of a mirror adjusting instrument adjusts the mirror by hand, he experiences a counterforce which is mainly determined by the above-mentioned threshold value of the friction coupling. Since it is desired that the counterforce felt is reproducible, and is preferably the same in all adjusting directions and for all mirror adjusting instruments, it it hence preferred to have a properly predictable friction threshold value which is preferably maximally independent of environmental factors such as temperature, degree of humidity and measure of lubrication. These properties are provided by the preferred embodiment 130 of a slip coupling according to the present invention, to be discussed hereinbelow with reference to FIGS. 7 and 8A–B.

Figure 7:
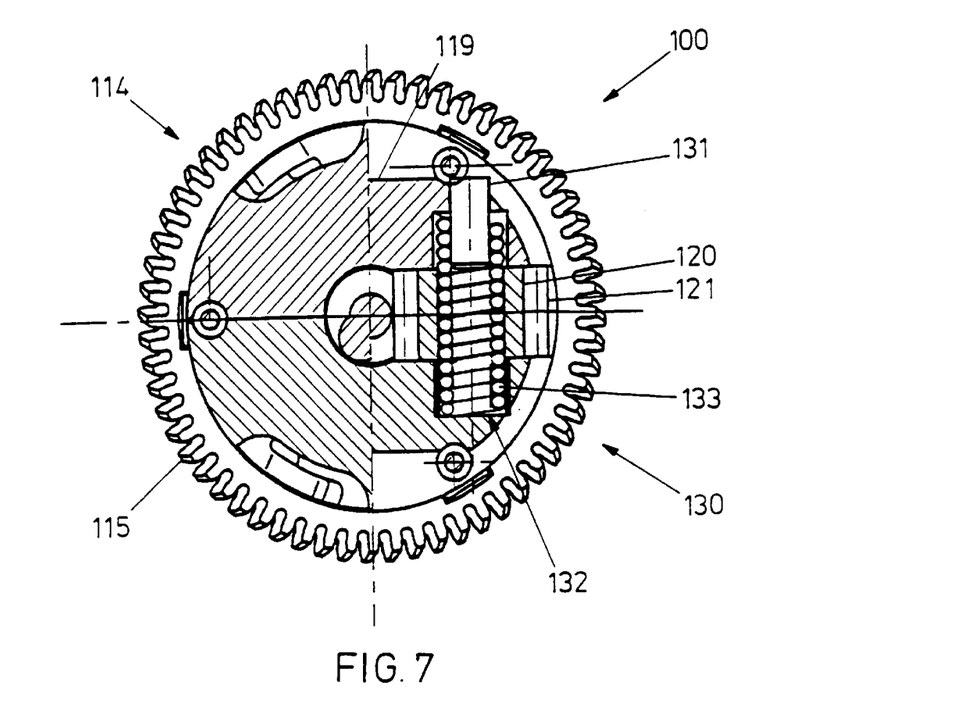
FIG. 7 is a section taken on the line VII—VII of the preferred embodiment shown in FIG. 4.
Figure 8A:
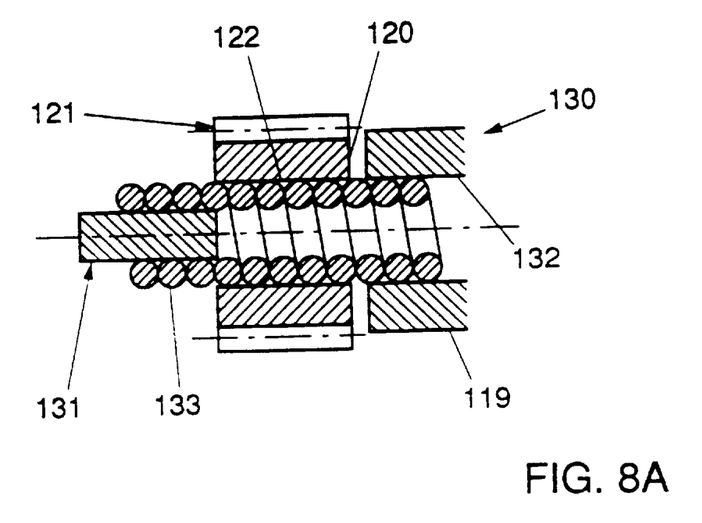
FIG. 8A shows a detail of the slip coupling of FIG. 7 to explain the operation thereof.

The operation of this slip coupling 130 is based on a wrap spring 133, which in the case shown in FIGS. 7 and 8A extends grippingly through an axial opening 122 of the slip wheel 120 and protects from that opening on both sides. By "grippingly" is meant here that the inside diameter of the opening 122 is slightly, for instance about 0.1 mm, smaller than the outside diameter of the wrap spring 133 in released condition. The free outer ends of the wrap spring 133 are grippingly arranged about a shaft 131 and in a bore 132 in the gear wheel 114 respectively. The shaft 131 has its free outer end grippingly arranged in (the internal parts 119 of) the gear wheel 114, and does not extend into the opening 122 of the slip wheel 120. The shaft 131 can also be manufactured as an integral part of the gear wheel 114.

A wrap spring is in fact an element of a resilient material, usually spring steel, wound into a screw spiral. Such a wrap spring has the property that when it is loaded in torsion, i.e. one outer end is held in a fixed position while the other outer end is rotated about the body axis, the diameter of the coils becomes smaller or larger, depending on the direction of torsion: upon torsion in the direction of helix, the diameter becomes smaller, upon torsion against the direction of helix, the diameter becomes larger. If that outer end were wound about a shaft, then, in the case of the above-mentioned torsion, that screw spiral would, depending on the direction of torsion, loosen from that shaft (slipping; torsion against the direction of helix) or, by contrast, be clamped tightly around it (choking; torsion in the direction of helix). The same effect occurs when that one outer end were disposed in a bore: in that case, the screw spiral is clamped tightly against the wall of that cylindrical space when there is torsion against the direction of helix. This property is utilized in the wrap spring coupling shown. When the slip wheel 120 is driven for rotation along with the direction of helix of the wrap spring 133, viewed from the shaft 131, then the wrap spring 133 will show a tendency to be clamped around the shaft 131 and in the bore 132 owing to the self-gripping effect, but when the driving force is sufficiently great, the slip wheel 120 will slip over the spring 133 owing to the self-loosening effect. Conversely, when the slip wheel 120 is driven for rotation against the direction of helix of the wrap spring 133, viewed from the shaft 131, then the wrap spring 133 will show a tendency to be clamped in the slip wheel 120 owing to the self-gripping effect, but when the driving force is sufficiently great, the wrap spring 133 will slip over the shaft 131 and in the bore 132 owing to the self-loosening effect. Hence, regardless of the direction of rotation, sufficient driving force will in each case involve the occurrence of slip, either of the slip wheel relative to the wrap spring, or of the wrap spring relative to its bearing. In this respect, it is a particular feature that the thus occurring friction value, also referred to as "slip moment", proves to be virtually independent of the friction coefficient of the relevant materials and, accordingly, virtually independent of environmental factors such as temperature, humidity, degree of lubrication, etc.

Figure 8B:
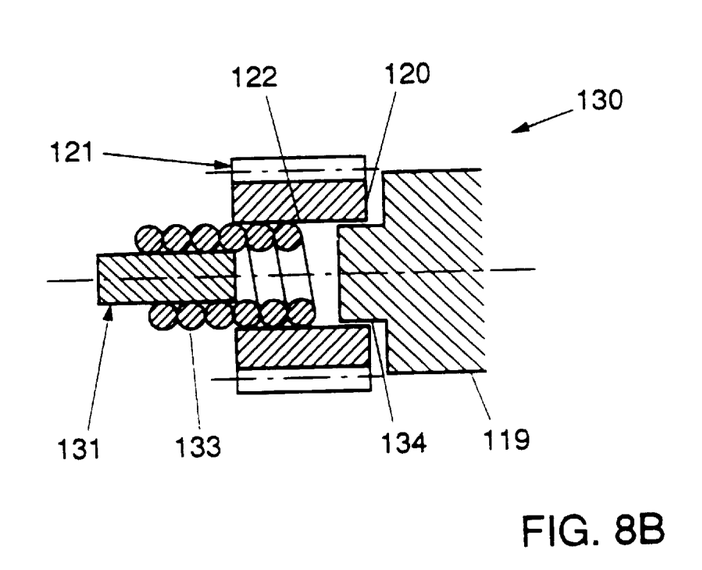
FIG. 8B shows a variant of the slip coupling of FIG. 8A.

FIG. 8B shows a somewhat simplified variant of the slip coupling of FIG. 8A. In the variant shown in FIG. 8B, the wrap spring 133 projects from the axial opening 122 of the slip wheel 120 by one outer end only, and that projecting outer end is grippingly arranged around the shaft 131. In this case, the gear wheel 114 does not have a bore 132 but a cylindrical projection 134 acting as a bearing for the slip wheel 120. For the rest, the operation of this variant is similar to that of the embodiment of FIG. 8A.

It will be readily understood by a skilled person that within the framework of the present invention it is possible to alter of modify the embodiments shown of the displacement adjustment device according to the invention without departing from the inventive concept or the protective scope as defined by the claims.

For instance, it is possible that the displacement adjustment device comprises several slip wheels.

In the embodiment discussed with reference to FIGS. 3, 4 and 7, those several slip wheels, for instance three, could then be disposed around the bar 11, with their axes of rotation lying in one plane perpendicular to that bar 11.

In the embodiment discussed with reference to FIG. 6, those several slip wheels could then be juxtaposed in friction contact with one another. In FIG. 6, this is illustrated for two slip wheels 120 and 120', whose respective teeth 121 and 121' engage with the internal screw thread 171 of the gear wheel 114 diametrically opposite one another (with regard to the axis of rotation of the gear wheel 114). If the bar 11 is axially displaced by an external force, the two slip wheels 120 and 120' rotate in opposite directions, a friction force being generated by the surfaces, rubbing each other, of those slip wheels, which friction force can be considered to be a part of the slip coupling in the rotation bearing of the two slip wheels relative to the bar 11.

In both above-mentioned cases, the advantage achieved is that the clamping force required for reaching a particular friction threshold value is reduced. Moreover, in the embodiment 170 of FIG. 6, the additional advantage is achieved that the bar 11 with the coupling gear wheels 120 and 120' is automatically self-centering, in a force-closed manner, relative to the gear wheel 114.

It is even possible that instead of several discrete slip wheels disposed around the spindle 11, one or several "bent" gear wheels are provided, manufactured from an elastic material such as rubber, whose longitudinal axis is bent and directed tangentially relative to the spindly. In released situation, such bent gear wheel has the shape of an elongated cylindrical body of a suitable, for instance square or star-shaped section. In built-in condition, that elongated body lies coiled in a groove of the spindle, and that body projects radially from that groove. The radially projecting part of that body lies in a groove in the wheel 114 so that the bent elastic body acts as a coupling piece between the wheel 114 and the spindle 11. When the wheel 114 rotates, the spindle 11 is screwed outwards, except when the spindle is retained: in that case, the elongated body has to rotate about its (bent) body axis, with the continuous occurrence of an elastic deformation. The energy required for this is then the source for the friction force in this coupling.

Finally, it is observed that within the purview of the present invention, whenever the term "translation" or "translatory movement" is used, a displacement having a linear component is meant. Consequently, within the purview of the present invention, these terms also relate to, for instance, a helical movement, which, after all, can be regarded as a combination of a true rotation and a true translation.

Further, the hollow 116 in the gear wheel 114 need not be circular-cylindrical.

I claim:

1. A displacement adjustment device for converting a rotation into a translation, comprising:
   a frame;
   a rotation input member which is mounted so as to be rotatable but axially secured relative to the frame, said rotation input member being provided with a hollow extending axially therethrough;
   a bar positioned in the hollow and having its outside surface provided with a screw thread, means being provided for preventing rotation of said bar relative to the frame; and a coupling gear wheel arranged for rotation in the rotation input member, wherein the axis of rotation of the coupling gear wheel is substantially perpendicular to the axis of rotation of the rotation input member, wherein the coupling gear wheel has teeth engaging with the screw thread of the bar, and wherein the coupling gear wheel includes a slip coupling relative to the rotation input member.

2. A displacement adjustment device according to claim 1, wherein the rotation input member is a gear wheel or a worm wheel, with a gear ring suitable for drive by means of a worm coupled to a driven shaft of an electromotor.

3. The displacement adjustment device according to claim 1, wherein said slip coupling comprises a wrap spring.

4. The displacement adjustment device according to claim 1, wherein the outside surface of the rotation input member is provided with spherical portions.

5. The displacement adjustment device according to claim 2, wherein said gear ring has a partly spherical shape.

6. The rotation input member for use in a displacement adjustment device according to claim 1, said rotation input member being a gear wheel or a worm wheel and comprising a gear ring which is suitable for cooperation with a worm;

said rotation input member being provided with a hollow axially extending therethrough;

and wherein a coupling gear wheel is rotatably arranged in the rotation input member, wherein the axis of rotation of the coupling gear wheel is substantially perpendicular to the axis of rotation of the rotation input member, wherein the coupling gear wheel has teeth extending into the hollow, and wherein the coupling gear wheel includes a slip coupling relative to the rotation input member.

7. A rotation input member according to claim 6, wherein said slip coupling comprises a wrap spring.

8. A rotation input member according to claim 6 wherein the outside surface of the rotation input member is provided with spherical portions, and wherein said gear ring has a partly spherical shape.

9. A displacement adjustment device for converting a rotation into a translation, comprising:

a frame;

a rotation input member which is mounted so as to be rotatable but axially secured relative to the frame, said rotation input member being provided with a hollow extending axially therethrough;

a bar positioned in the hollow and having its outside surface provided with a screw thread, means being provided for preventing rotation of said bar relative to the rotation input member; and a coupling gear wheel arranged for rotation in the frame or a part fixed thereto, wherein the axis of rotation of the coupling gear wheel is substantially perpendicular to the axis of rotation of the bar, wherein the coupling gear wheel has teeth engaging with the screw thread of the bar, and wherein the coupling gear wheel includes a slip coupling relative to the frame or the part fixed thereto.

10. The displacement adjustment device according to claim 9, wherein the rotation input member is a gear wheel or a worm wheel, with a gear ring suitable for drive, by means of a worm coupled to a driven shaft of an electromotor.

11. A displacement adjustment device according to claim 9 wherein said slip coupling comprises a wrap spring.

12. A displacement adjustment device for converting a rotation into a translation, comprising:

a frame;

a rotation input member which is mounted so as to be rotatable but axially secured relative to the frame, which rotation input member is provided with a cylindrical hollow extending axially therethrough and having an internal screw thread;

a bar positioned in the hollow and comprising means for preventing rotation of said bar relative to the frame; and a coupling gear wheel rotatably provided on the bar, wherein the axis of rotation of the coupling gear wheel is substantially perpendicular to the axis of rotation of the rotation input member, wherein the coupling gear wheel has teeth engaging with the screw thread of the rotation input member, and wherein the coupling gear wheel includes a slip coupling relative to the bar.

13. The displacement adjustment device according to claim 12, wherein the rotation input member is a gear wheel or a worm wheel, with a gear ring suitable for drive, by means of a worm coupled to a driven shaft of an electromotor.

14. The displacement adjustment device according to claim 12, wherein said slip coupling comprises a wrap spring.

15. The displacement adjustment device according to claim 12, wherein the bar is shaped as a body bent in the shape of a U having legs and, wherein the coupling gear wheel is mounted in the outer ends of said legs and, wherein legs and are pretensioned towards each other so that they exert a pinching force on the side faces of the coupling gear wheel to define said slip coupling.

16. The displacement adjustment device according to claim 12, wherein two coupling wheels and are provided on the bar, wherein the respective axis of rotation of each of said coupling gear wheels and is substantially perpendicular to the axis of rotation of the rotation input member, wherein each coupling gear wheel has respective teeth which engage with the screw thread of the rotation input member diametrically opposite each other, wherein each of said coupling gear wheels and includes a slip coupling relative to the bar, and wherein said two coupling gear wheels and abut against each other.

* * * * *